United States Patent [19]
Buchan et al.

[11] 3,771,114
[45] Nov. 6, 1973

[54] ACCOUSTICAL TAPE LOOP SENSOR

[75] Inventors: William Arthur Buchan, El Toro, Calif.; John Joseph Ring, Mission Viejo, Calif.

[73] Assignee: Century Data Systems, Inc., Anaheim, Calif.

[22] Filed: Nov. 11, 1971

[21] Appl. No.: 197,867

[52] U.S. Cl............... 340/1 R, 226/42, 226/45, 340/5 S
[51] Int. Cl.............................................. G01s 9/68
[58] Field of Search .................. 226/29, 30, 42, 43, 226/45; 340/1 R, 1 L, 1 T, 259, 260, 3 R, 5 S, 16 C; 181/0.5 NP

[56] References Cited
UNITED STATES PATENTS

| | | |
|---|---|---|
| 2,743,429 | 4/1956 | Erdman et al. ..................... 340/1 R |
| 3,673,553 | 6/1972 | Miura et al. ......................... 340/5 S |
| 3,564,490 | 2/1971 | Camp................................... 340/3 R |
| 3,017,606 | 1/1962 | Kietz et al............................ 340/3 R |
| 3,047,198 | 7/1962 | Long..................................... 226/42 |

*Primary Examiner*—Richard A. Farley
*Attorney*—John A. Duffy et al.

[57] ABSTRACT

A pulsed ultrasonic ranging system may be used to sense the position and velocity of tape in a vacuum buffer column. The received pulses may be stored in an accumulator to provide position information whereas the value of successive accumulations can be used to indicate velocity. A single piezo-electric transducer can be used as both transmitter and receiver.

1 Claim, 8 Drawing Figures

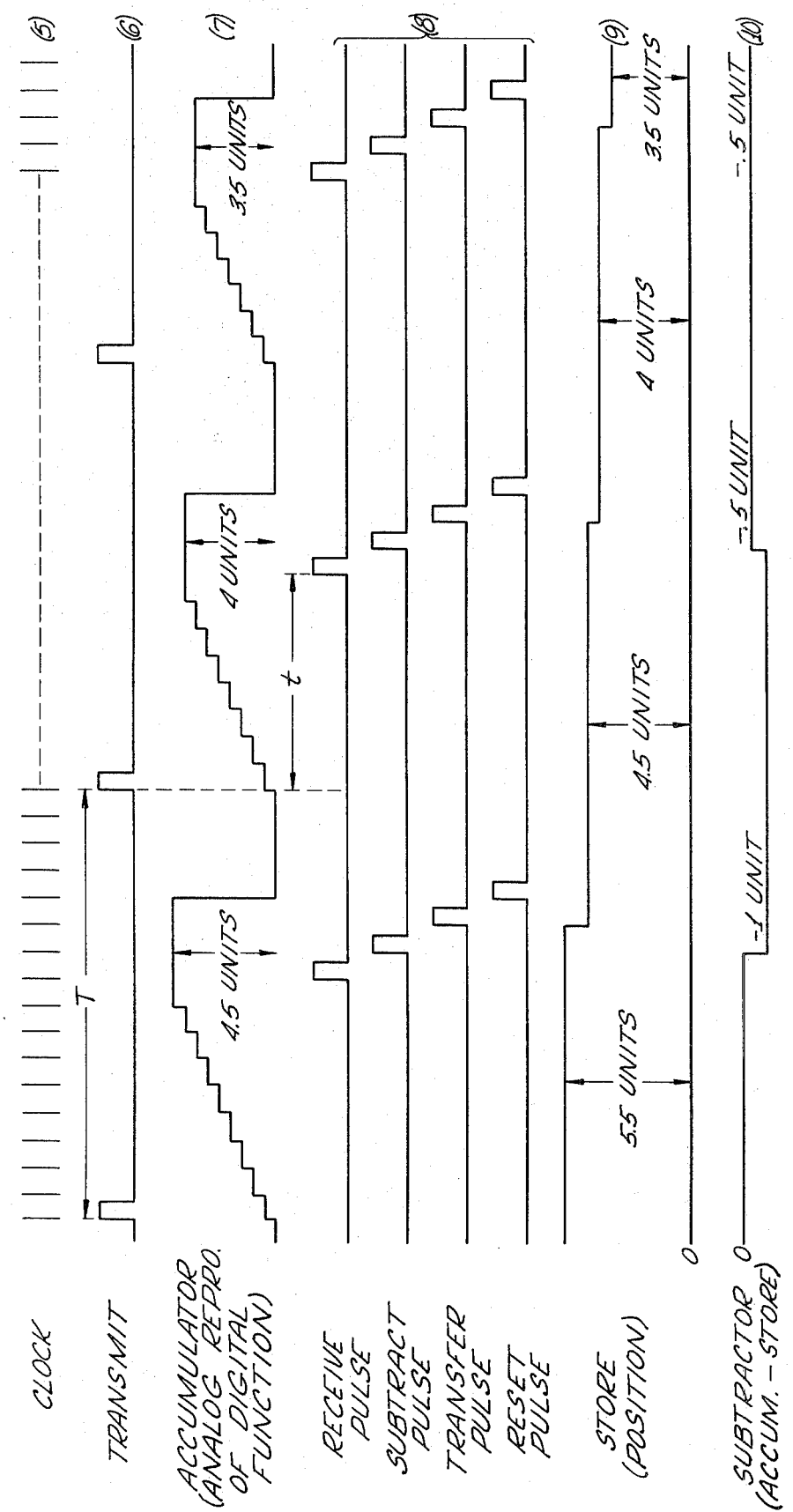

Fig. 8.
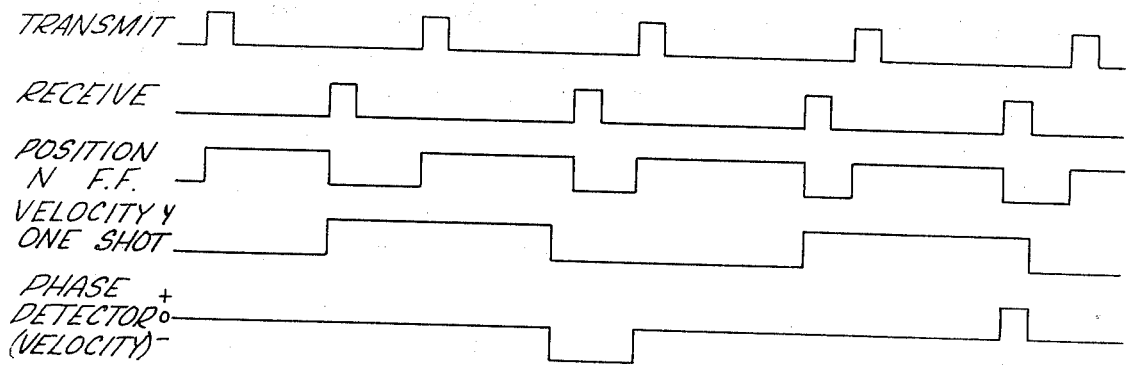
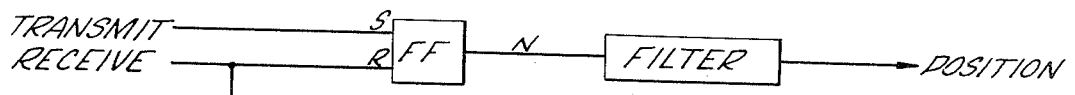
Fig. 7.
Fig. 6.
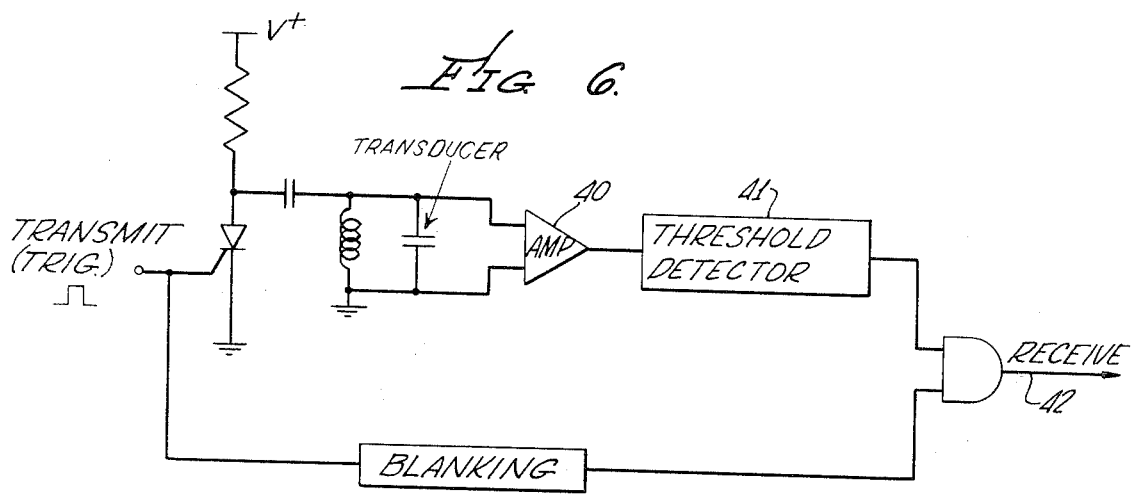

ACCOUSTICAL TAPE LOOP SENSOR

BACKGROUND OF THE INVENTION

In a typical computer tape system, the high inertia storage reels are isolated from one another by buffer vacuum columns. These columns are spaced on either side of a capstan drive arrangement, and allow the tape at the capstan to be rapidly stopped and started while the reels follow with lower acceleration rates. In order to effect proper operation of the reels, it is necessary to supervise the status of tape in these columns. Numerous devices have been utilized to accomplish this function such as optical sensing, capacitive sensing, pressure sensing, etc. Each of the prior art solutions to the problem have relative advantages and disadvantages. For example, the optical system is subject to effects of ambient background lighting; the capacitive system is dependent upon accurate mechanical characteristics and is affected by vibration and temperature changes, the pressure system is limited to bang-bang type of servos (ON-OFF) with the consequent effect of hunting, etc. What is actually desired is a proportional sensing system which is relatively unaffected by external environmental factors.

Accordingly, a primary object of the present invention is to provide an accoustical tape loop detecting system.

Another object of the present invention is to provide a system for sensing both the position and velocity of tape in a buffer column.

It is a further object of the present invention to provide a proportional tape loop servo system which is relatively uninfluenced by extraneous environmental changes.

Other objects and advantages of the present invention will be obvious from the detailed description of a particular embodiment given herein below.

SUMMARY OF THE INVENTION

The invention comprises an ultrasonic transducer which is pulsed to provide transmit signals that are reflected from the tape inside the column. The return signals from the tape are sensed by the same transducer — and the echo time is measured by a high frequency digital clock whose pulses are stored in an accumulator during the time between the transmit and receive signals. When the echo signal is received the accumulator contents is a measure of tape position. Each accumulator count is stored and the difference between the present accumulator contents and a previous one is used to measure tape velocity. The resultant position and velocity information are used as inputs to the reel servos.

DESCRIPTION OF THE DRAWINGS

FIG. 5 shows the waveforms associated with the elements shown in FIG. 4.

FIG. 6 shows the crystal excitation and reception circuitry.

FIG. 7 is a block diagram of an analog embodiment of the invention.

FIG. 8 shows the waveforms associated with the elements shown in FIG. 7.

DETAILED DESCRIPTION OF A PREFERRED EMBODIMENT

Figure 1:
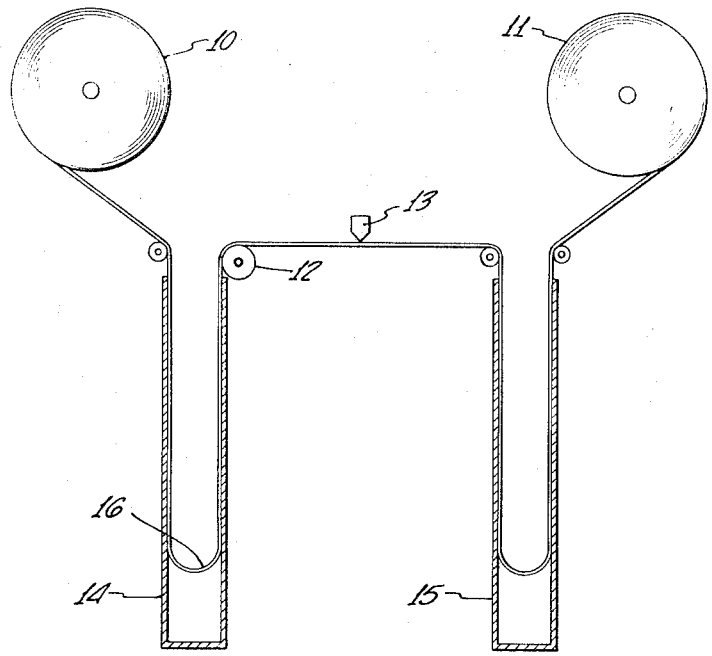
FIG. 1 shows a typical buffered tape transport.

Adverting to the drawings and particularly FIG. 1, a typical buffered loop tape transport comprises a pair of reels 10 and 11, a capstan 12, a read-write head assembly 13 and a pair of vacuum columns 14 and 15. The position of the tape 16 in a vacuum column (for example column 14) is maintained by a servo system which drives the reel 10 so as to bring the loop to some pre-established null (normally near the physical center of the column). In the present invention, the signal which controls the servo is derived from the accoustical sensing arrangement shown in FIG. 2. In this system, a piezo-electric transducer 17 is mounted in the floor 18 of the column and used to generate an ultrasonic pulse which is reflected from the tape 16. The return signal is detected by the same transducer 17 and the time lapse $t$ between the transmitted signal and the echo determines the distance $L$ between the transducer 17 and the tape 16, i.e., $$t = 2L/v_c$$

where $v_c$ = velocity of sound in the low pressure area beneath the tape.

Figure 3:
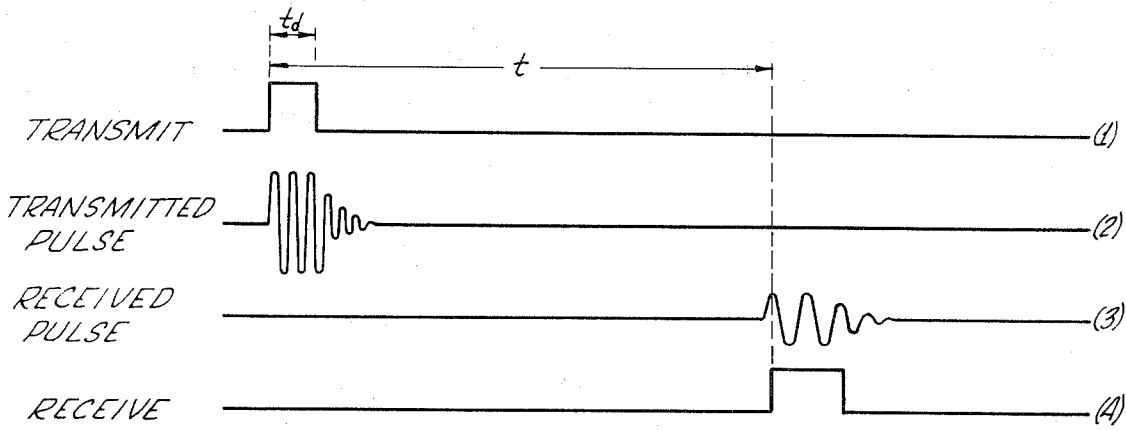
FIG. 3 shows the timing waveforms between TRANSMITTED and RECEIVED signals.

FIG. 3 shows a timing diagram of transmitted and received pulses. During the duration $t_d$ of the driving pulse [line (1)] the piezo-electric crystal 17 is driven at its resonant frequency to produce the oscillatory waveform shown as the transmitted pulse [line (2)]. Upon return, the echo causes the piezo-electric crystal to vibrate at its resonant frequency producing the electrical voltage shown on line (3). This voltage is amplified and used to trigger an electronic circuit (such as a one shot multi-vibration) whose output is indicated on line (4).

Figure 2:
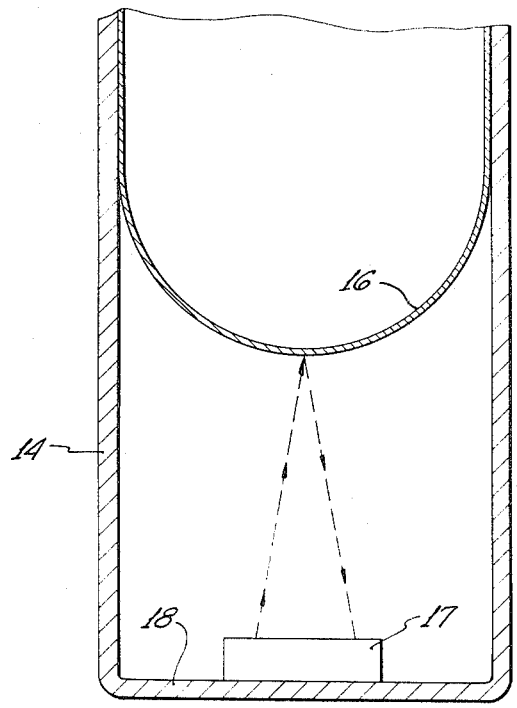
FIG. 2 shows the physical arrangement of the accoustical sensor relative to the tape column.
Figure 4:
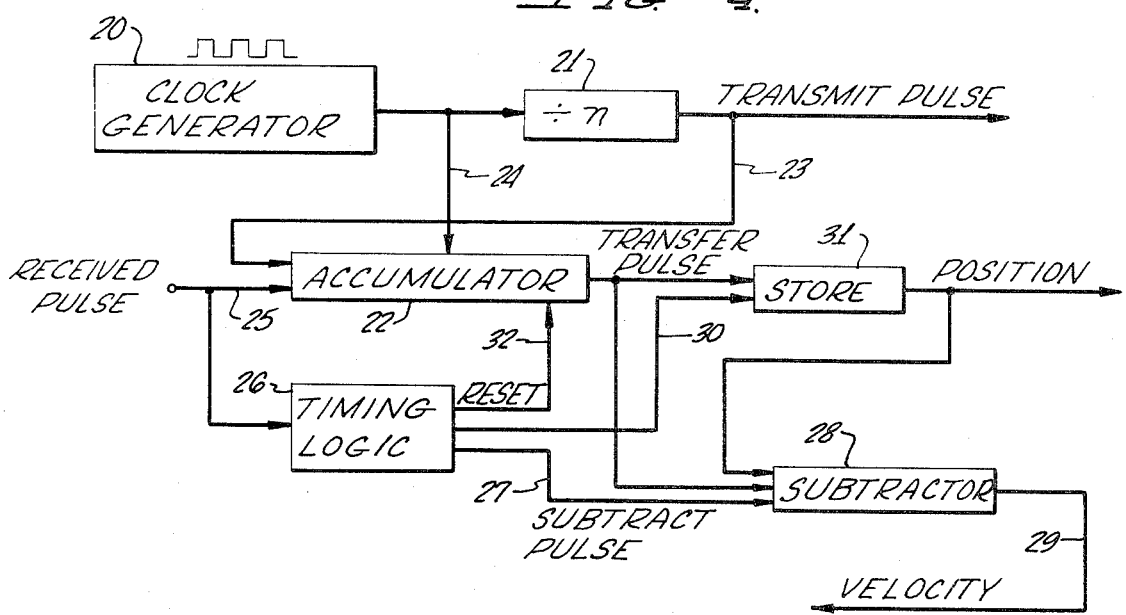
FIG. 4 shows a block diagram of a digital circuit embodiment of the invention.

FIG. 4 shoes a block diagram of the requisite circuitry for practicing the invention. The corresponding waveforms are shown in FIG. 5. The operation of the system is as follows: The clock generator 20 produces pulses every 20 μsec as shown in FIG. 5 (CLOCK). The output of the clock generator 20 is divided down by the frequency divider 21 to produce a transmit pulse every 6 milliseconds FIG. 5 [Xmit]. At the time of "TRANSMIT," the accumulator 22 is enabled (line 23) and counts clock pulses (line 24) until a "RECEIVE" pulse arrives (line 25). At this time the contents of the accumulator [FIG. 5-accum] are a measure of the length $L$ (FIG. 2). The timing logic 26 responds to the receive pulse and generates the appropriate subtract, transfer and reset pulses as indicated. The subtract pulse (line 27) causes the contents stored from the previous accumulator (located in memory 31) to be subtracted from the present accumulator content. This is accomplished by the subtractor 28. This difference is the velocity (line 29). The transfer pulse (line 30) causes the present contents of the accumulator to be transferred to store (memory 31). The reset pulse (line 32) resets the accumulator 22 to zero in readiness for the next TRANSMIT - RECEIVE cycle. The corresponding waveforms for successive accumulator values of 4.5, 4 and 3.5 units are illustrated on line (7) - (10) of FIG. 5.

FIG. 7 shows a typical circuit for driving the piezo-electric crystal. The return wave causes the crystal to vibrate at its resonant frequency producing an electrical output which amplified (amplifier 40) and detected (threshold detector 41) to produce an electrical pulse on line 42.

An analog embodiment (and the associated waveforms) of the invention is shown in FIGS. 7 and 8 respectively. In this system, the transmit pulse sets a flip flop to one state and the receive pulse sets it to the opposite state. The filtered output is a voltage whose amplitude is proportional to position. Alternate "RECEIVE" pulses are also used to trigger a one shot whose pulse width is equal to the time between TRANSMIT PULSES. The phase difference between the trailing edge of the one shot and the next "RECEIVE" pulse is a measure of velocity. This phase difference is detected by the phase detector and the output is filtered to provide a voltage proportional to velocity.

It will be obvious of course, that what has been said with respect to sensing the tape in one column is equally applicable to sensing tape in the other column. It should also be evident that the basic concept of the invention is not limited to magnetic tape or buffer columns in general — but is equally applicable to numerous sound ranging systems such as safety devices, rear-end collision vehicle warning devices, etc. Nor is the invention limited to the particular arrangement of components shown herein — it being understood that the particular embodiment was used for exemplary purposes only, and that numerous changes, modifications, and substitutions may be made without departing from the spirit of the invention.

We claim:

1. A system for supervising tape in a buffer column comprising:
   means for transmitting an acoustical signal within a tape buffer column;
   means for sensing an echo signal reflected from the tape in the buffer column;
   means for measuring the time between the transmitted signal and the echo signal whereby the position of the tape may be determined, said time measuring means comprising:
   a flip flop;
   means for setting said flip flop to a first state at the time a signal is transmitted; and means for setting said flip flop to its opposite state at the time a signal is received, whereby the average value of the output of said flip flop is a representation of the time between transmitted and received signals, and wherein is a,
   means for measuring the velocity of the tape in the column, said velocity measuring means comprising:
   detection means responsive to alternate echo signals; a one shot multivibrator responsively connected to said detection means, said one shot having a period equal to the time between transmit signals; means for detecting the phase difference between the time at which said one shot returns to its stable state and the time at which an echo signal is received.

* * * * *